United States Patent
Liu

(10) Patent No.: US 8,431,066 B2
(45) Date of Patent: *Apr. 30, 2013

(54) METHOD FOR MAKING CARBON NANOTUBE FILM

(75) Inventor: Liang Liu, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 245 days.

This patent is subject to a terminal disclaimer.

(21) Appl. No.: 12/952,402

(22) Filed: Nov. 23, 2010

(65) Prior Publication Data

US 2011/0233816 A1     Sep. 29, 2011

(30) Foreign Application Priority Data

Mar. 29, 2010   (CN) .......................... 2010 1 0134601

(51) Int. Cl.
- *B29C 33/38*   (2006.01)
- *B29C 33/62*   (2006.01)
- *B29C 35/08*   (2006.01)
- *B29C 53/82*   (2006.01)

(52) U.S. Cl.
USPC ........... 264/482; 264/164; 264/337; 264/338; 264/496

(58) Field of Classification Search .................. 264/164, 264/165, 212, 337, 338, 482, 496
See application file for complete search history.

(56) References Cited

U.S. PATENT DOCUMENTS

| | | |
|---|---|---|
| 7,288,321 B2 | 10/2007 | Liu et al. |
| 2008/0248235 A1 | 10/2008 | Feng et al. |
| 2009/0208708 A1* | 8/2009 | Wei et al. .................. 264/164 X |
| 2009/0297732 A1 | 12/2009 | Jiang et al. |

FOREIGN PATENT DOCUMENTS

| | | |
|---|---|---|
| CN | 1502553 | 6/2004 |
| CN | 101591015 | 12/2009 |

* cited by examiner

*Primary Examiner* — Leo B Tentoni
(74) *Attorney, Agent, or Firm* — Altis Law Group, Inc.

(57) ABSTRACT

The present disclosure relates to a method for making a carbon nanotube film. In the method, a bent flexible substrate having a curved surface is provided. A carbon nanotube array on the curved surface of the bent flexible substrate is fabricated. The bent flexible substrate is at least partially unbent, thereby at least partially unbending the carbon nanotube array. A drawing tool is provided to contact the unbent carbon nanotube array to select a carbon nanotube segment from the carbon nanotube array. The selected carbon nanotube segment is drawn using the drawing tool, thereby forming the carbon nanotube film.

19 Claims, 4 Drawing Sheets

METHOD FOR MAKING CARBON NANOTUBE FILM

CROSS-REFERENCE TO RELATED APPLICATIONS

This application claims all benefits accruing under 35 U.S.C. §119 from China Patent Application No. 201010134601.3, filed on Mar. 29, 2010, in the China Intellectual Property Office, the disclosure of which is incorporated herein by reference. This application is related to commonly-assigned applications entitled, "METHOD FOR MAKING CARBON NANOTUBE FILM," filed on Nov. 23, 2010, and application Ser. No. 12/952,396; and "CARBON NANOTUBE ARRAY STRUCTURE AND METHOD FOR MAKING THE SAME", filed on Oct. 29, 2010, and application Ser. No. 12/915,263.

BACKGROUND

1. Technical Field

The present disclosure relates to a method for making carbon nanotube film.

2. Description of Related Art

Carbon nanotubes are hollow tubular structures having excellent mechanical, thermal, and electrical properties. Their unique properties make carbon nanotubes ideal candidates for potential applications in different fields. However, the carbon nanotubes with nanoscale dimension are difficult to process. Attempts to fabricate carbon nanotube structure with macroscale dimension for easy processing include fabricating the carbon nanotube structure into wire shapes, film shapes, or other macroscopic shapes.

Recently, a carbon nanotube film has been fabricated by drawing from a carbon nanotube array disclosed by patent application US20080248235A to Feng et al. The carbon nanotube film is a free-standing structure and includes a plurality of carbon nanotubes joined end-to-end by van der Waals attractive force therebetween. The carbon nanotubes in the carbon nanotube film are substantially aligned along the same direction. Thus, this carbon nanotube film has good thermal and electrical conductivity properties along the direction of the aligned carbon nanotubes. Therefore, the carbon nanotube film can be used in many different fields.

However, the size of the carbon nanotube film directly drawn from the carbon nanotube array is restricted by the size of the carbon nanotube array. During the growth of the carbon nanotube array using a CVD method, the inner gas pressure of the tube furnace is less than the atmospheric pressure outside the tube furnace. Therefore, the sidewall of the tube furnace must bear an inward pressure difference applied thereon. If the tube furnace with a diameter of about 10 inches and a length of about 2 meters has the inner gas pressure of about 10 torrs, the pressure difference between the inside and the outside of the tube furnace is about 50,000 Newton. However, if the diameter of the tube furnace is increased to 40 inches, the pressure difference could reach to about 200,000 Newton. Further, as the diameter of the tube furnace increases, the curvature of the sidewall of the tube furnace decreases, thus weakening the support of the sidewall and may cause damage to the tube furnace.

Accordingly, the tube furnace with a larger diameter cannot be achieved. The conventional tube furnace for growing the carbon nanotube array has a diameter of about 10 inches. Therefore, a substrate disposed inside the tube furnace should have a diameter less than 10 inches, such as 8 inches. An original carbon nanotube film directly drawn from the carbon nanotube array grown on that 8-inch substrate has a width restricted to 8 inches. The area and the width of the carbon nanotube film are also restricted.

What is needed, therefore, is to provide a method for making a carbon nanotube film having a relatively large size.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "another", "an", or "one" embodiment in this disclosure are not necessarily to the same embodiment, and such references mean at least one.

Figure 1:
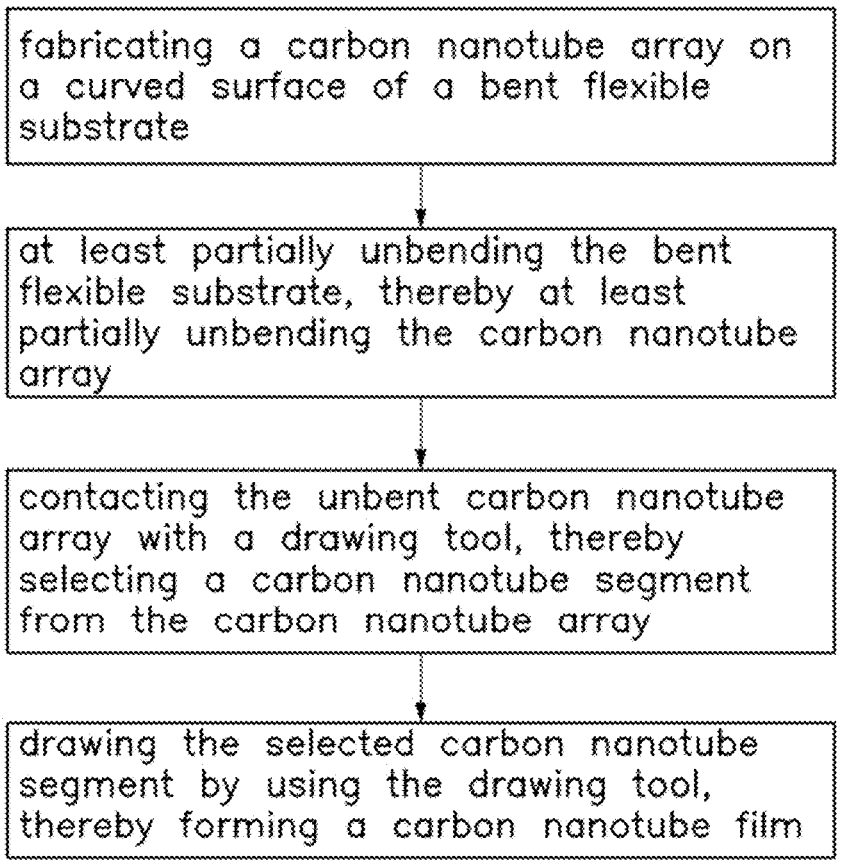
FIG. 1 is a flow chart of an embodiment of a method for making a carbon nanotube film.
Figure 2:
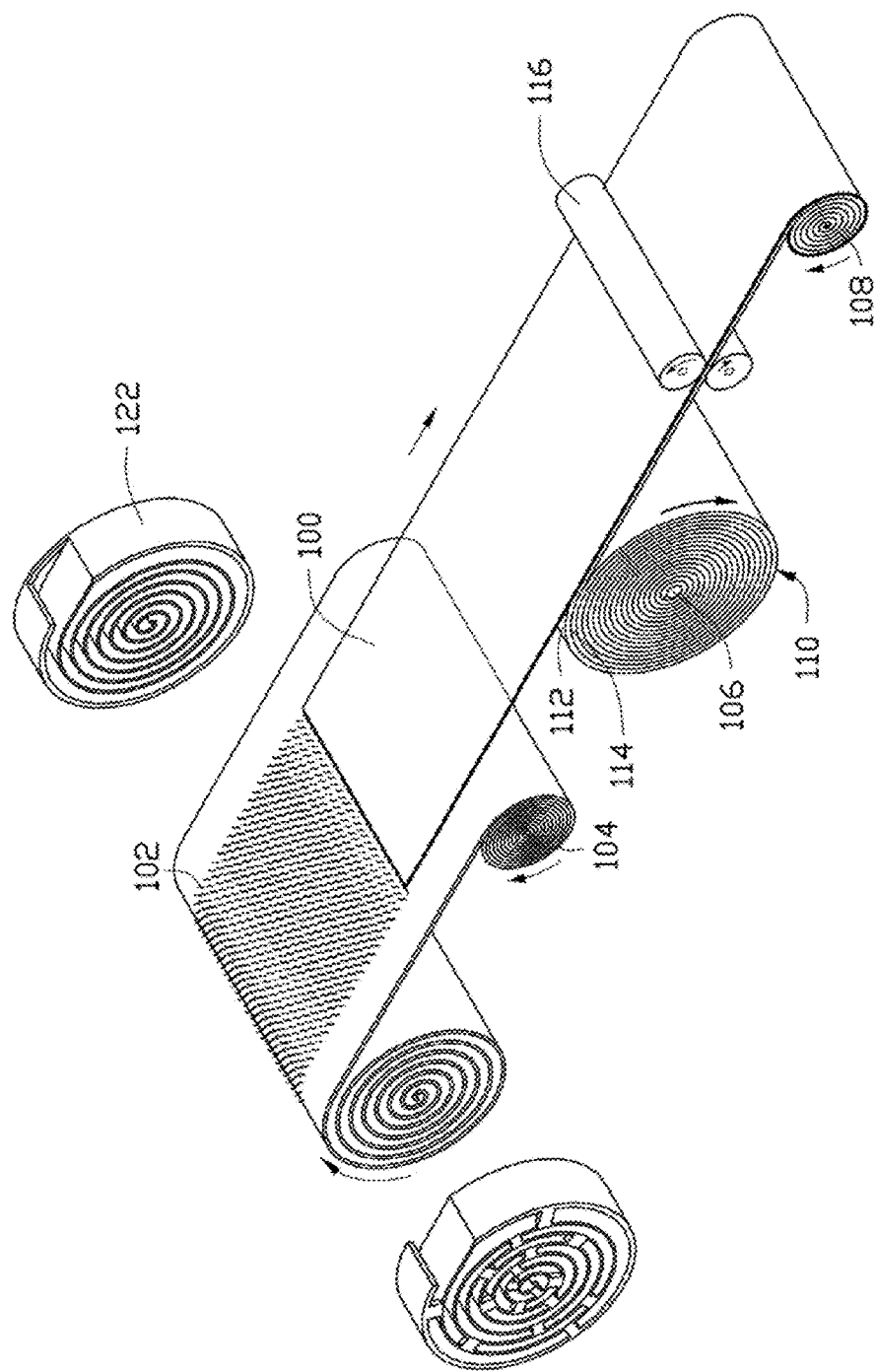
FIG. 2 is a schematic view of the method of FIG. 1.

Referring to FIGS. 1 and 2, an embodiment of a method for making a carbon nanotube film includes steps of:

S1, fabricating a carbon nanotube array 102 on a curved surface of a bent flexible substrate 104.

S2, at least partially unbending the bent flexible substrate 104, thereby at least partially unbending the carbon nanotube array 102.

S3, contacting the unbent carbon nanotube array 102 with a drawing tool, thereby selecting a carbon nanotube segment from the carbon nanotube array 102.

S4, drawing the selected carbon nanotube segment using the drawing tool, thereby forming a carbon nanotube film 100.

In step S1, the flexible substrate 104 is plane shaped. The carbon nanotube array 102 can be grown on the curved surface of the bent flexible substrate 104 by using a chemical vapor deposition (CVD) method. In one embodiment, the carbon nanotube array 102 is a super aligned carbon nanotube array that is capable of having a carbon nanotube film drawn therefrom. The method for making the super aligned carbon nanotube array includes sub-steps of:

S11, providing a plane shaped flexible substrate 104 bent into a curved structure with at least one curved surface, on which a catalyst layer is formed;

S12, heating the bent flexible substrate 104 with the catalyst layer at a temperature in an approximate range from about 500° C. to about 900° C. (e.g. 740° C.) in a furnace with a protective gas therein; and S13, supplying a carbon source gas into the furnace for about 5 minutes to about 30 minutes and growing the super-aligned carbon nanotube array on the at least one curved surface.

In step S11, the flexible substrate 104 can be made of a heat-resistant material, has a planar shape, and can be bent to support the carbon nanotube array 102.

A melting point of the flexible substrate 104 is greater than a growing temperature of the carbon nanotube array 102. In one embodiment, the melting point of the flexible substrate 104 is greater than about 500° C. The flexible substrate 104 has a small thickness and has a sheet shape. Specifically, the material of the flexible substrate 104 can be metal, quartz, silicon, ceramic or any combination thereof, wherein the metal can be molybdenum (Mo), titanium (Ti), zirconium (Zr), columbium (Nb), tantalum (Ta), hafnium (Hf), tungsten (W), vanadium (V), stainless steel, or any alloy thereof. In addition, a thickness of the flexible substrate 104 can be set to ensure that the flexible substrate 104 can be bent without fracture. The smaller the thickness of the flexible substrate 104, the more the flexible substrate 104 can be bent. If the flexible substrate 104 is a metal or alloy slice, the thickness of the flexible substrate 104 can be smaller than or equal to 3 millimeters (mm) and greater than or equal to 0.005 mm. If the flexible substrate 104 is a silicon slice, a quartz slice, or a ceramic slice, the thickness of the flexible substrate 104 can be less than or equal to 0.3 mm (e.g., less than or equal to 0.1 mm and greater than or equal to 1 micrometer (μm)). In one embodiment, the flexible substrate 104 is a quartz slice with a thickness of about 50 μm, and has at least one smooth surface.

The flexible substrate 104 is flexible and can be bent into different shapes such as a tubular shape, a helix shape, or a "U" shape. Specifically, the at least one curved surface of the bent flexible substrate 104 can be a surface generated by a straight line with a certain length intersecting and moving along a curve, i.e., the directrix, while remaining parallel to a fixed straight line that is not on or parallel to the plane of the directrix. For example, if the directrix is round, the curved surface is cylindrical surface, and if the directrix is a helical line, the curved surface is a helical surface. In one embodiment, the curved surface is a helical surface, namely, the flexible substrate 104 is bent into a helical shape. The helical shaped flexible substrate 104 defines a helical shaped space. A width of the space should be larger than a height of the carbon nanotube array 102.

In addition, the catalyst layer can be formed on the flexible substrate 104 before or after bending the flexible substrate 104. A material of the catalyst layer can be iron (Fe), cobalt (Co), nickel (Ni), or any alloy thereof. The catalyst layer can be formed on the curved surface by thermochemical deposition, electron beam deposition, magnetron sputtering, or evaporation. The thickness of the catalyst layer is determined by actual needs and can be in a range from about 1 nanometer (nm) to about 50 nm. The catalyst layer can be formed on two opposite curved surfaces of the flexible substrate 104 for forming two carbon nanotube arrays 102 thereon. In one embodiment, the catalyst layer is formed on a curved surface of the flexible substrate 104, and the catalyst layer is a Fe layer with a thickness of about 5 nm.

Furthermore, the flexible substrate 104 with the catalyst layer is annealed at a temperature in a range from about 300° C. to about 900° C. (e.g., 700° C.) in air for about 30 minutes to about 90 minutes.

In step S12, when the furnace is a quartz tube furnace and the flexible substrate 104 is bent into a tubular shape or a helical shape, the bent flexible substrate 104 can be disposed in the tube furnace with the axis of the flexible substrate 104 substantially parallel to the axis of the tube furnace. Furthermore, a bracket can be used to fix the bent shape of the flexible substrate 104 and support the bent flexible substrate 104, thereby suspending the bent flexible substrate 104 in the furnace. The structure of the bracket is not limited and should avoid obstructing the heat or the carbon source gas transmitted to the catalyst layer, as to not influence the growth of the carbon nanotube array 102. The protective gas can be made of at least one of nitrogen ($N_2$), ammonia ($NH_3$), and a noble gas.

In step S13, the carbon source gas can be a hydrocarbon gas, such as ethylene ($C_2H_4$), methane ($CH_4$), acetylene ($C_2H_2$), ethane ($C_2H_6$), or any combination thereof. The carbon nanotube array 102 includes a plurality of carbon nanotubes aligned along a direction substantially perpendicular to the curved surface of the flexible substrate 104. The carbon nanotubes are substantially straight. When the flexible substrate 104 is unbent to a flat shape, the carbon nanotubes are substantially parallel to each other, and substantially perpendicular to the unbent surface of the flexible substrate 104. The carbon nanotubes being substantially parallel to each other means that a large number of carbon nanotubes are arranged substantially along the same direction, and a small number of the carbon nanotubes may be randomly arranged, having a small if not negligible effect on the larger number of the carbon nanotubes. In addition, the carbon nanotubes do not need to be exactly perpendicular to the surface of the flexible substrate 104, but substantially perpendicular. The carbon nanotube array 102 is substantially pure, and a van der Waals attractive force exists between the carbon nanotubes in the carbon nanotube array 102.

It is difficult to process the steps S3 and S4 if the flexible substrate 104 is bent. Thus, after being removed from the furnace, the carbon nanotube array 102 grown on the flexible substrate 104 is first unbent in step S2 before step S3.

In step S2, the flexible substrate 104 is unbent, to form the carbon nanotube film 100. In one embodiment, the flexible substrate 104 is unbent into a flat shape, and correspondingly, the carbon nanotube array 102 is unbent into a flat shape.

Figure 3:
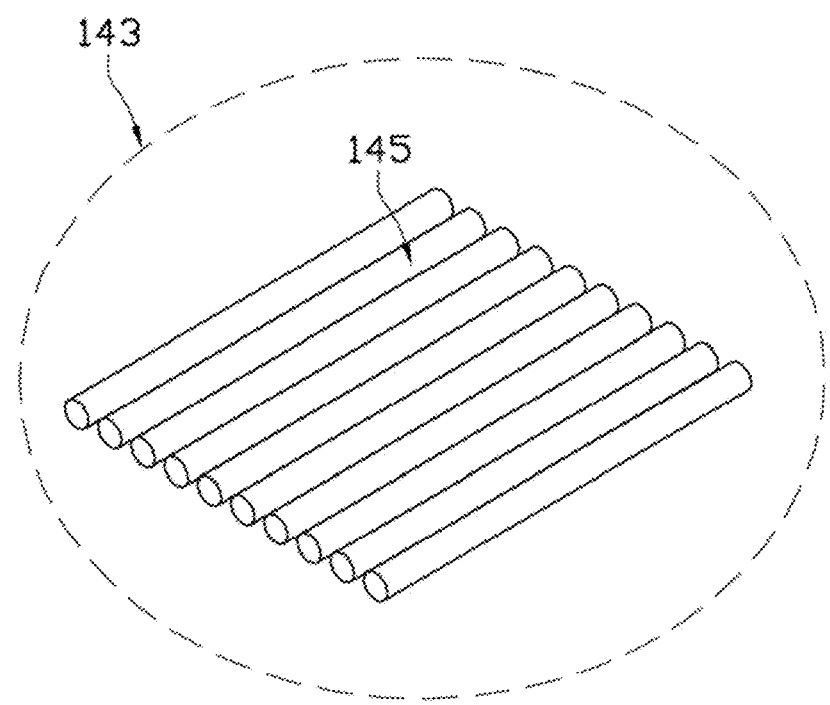
FIG. 3 is a schematic structural view of a carbon nanotube segment.

In step S3, referring to FIG. 3, the carbon nanotube segment 143 includes a plurality of adjacent carbon nanotubes 145 substantially parallel to each other. The drawing tool is used to draw the carbon nanotube segment 143 from the unbent carbon nanotube array 102. The drawing tool can be an adhesive tape or a rigid bar having a certain width. The drawing tool can contact the carbon nanotube segment 143 in the carbon nanotube array 102, and adhere to the carbon nanotube segment 143 thereon.

In step S4, the drawing tool gradually moves along a direction away from the carbon nanotube array 102, drawing the carbon nanotube segment 143 at a certain speed. During the drawing process, as the initial carbon nanotube segment 143 is drawn out, other carbon nanotube segments 143 are also drawn out end-to-end due to the van der Waals attractive force between ends of adjacent segments. In general, the initially selected carbon nanotubes are drawn out from the carbon nanotube array 102 by the movement of the drawing tool. The following carbon nanotubes that are adjacent to the initially selected carbon nanotubes are then drawn out by van der Waals attractive force between the following carbon nanotubes and the initially selected carbon nanotubes, thereby forming the carbon nanotube film 100 with carbon nanotubes joined end-to-end by van der Waals attractive force therebetween. This process of drawing ensures that a continuous, uniform drawn carbon nanotube film 100 is formed. A width of the carbon nanotube film 100 is substantially equal to the width of the selected carbon nanotube segment 143. The formed carbon nanotube film 100 is connected to the drawing tool at one end and connected to the carbon nanotube array 102 at an opposite end. A drawing angle is defined between the carbon nanotube film 100 and the flexible substrate 104 at the connecting position of the carbon nanotube film 100 with the carbon nanotube array 102. The drawing angle is greater than or equal to 0 degrees and smaller than 90 degrees. In one embodiment, the drawing angle is smaller than about 30 degrees. When the carbon nanotubes in the carbon nanotube array 102 are drawn out, a border at the connecting position of the formed carbon nanotube film 100 with the carbon nanotube array 102 is formed. The border gradually moves along a direction opposite to the drawing direction of the carbon nanotube film as the carbon nanotubes are gradually drawn out from the flexible substrate 104. In one embodiment, the border is substantially a straight line during the entire drawing process.

The steps S2, S3, and S4 can be simultaneously executed. First, the flexible substrate 104 is partially unbent, thereby partially unbending the carbon nanotube array 102. Next, a carbon nanotube film 100 is drawn out from the unbent carbon nanotube array 102. The flexible substrate 104 is then continuously unbent into a flat shape as the carbon nanotube film 100 is drawn out, thereby continuously providing the flat shaped carbon nanotube array 102 and continuously drawing out the carbon nanotube film 100 to form the flat shaped carbon nanotube array 102.

In addition, the steps S2, S3 and S4 can be separately executed. First, the flexible substrate 104 is entirely unbent, thereby entirely unbending the carbon nanotube array 102. Next, the carbon nanotube film 100 is continuously drawn out from the entire unbent carbon nanotube array 102.

In one embodiment, the steps S2, S3, and S4 are simultaneously executed. Specifically, the executing process includes the following steps of: (a), providing a fixing device and an unbending tool, and fixing one end of the flexible substrate 104 using the fixing device; (b) clamping a free end of the flexible substrate 104 using the unbending tool, and drawing the free end of the flexible substrate 104 along a direction, thereby partially unbending the flexible substrate 104, and partially unbending the carbon nanotube array 102; (c) drawing out the carbon nanotube film 100 from the unbent carbon nanotube array 102.

In step (a), the fixing device includes two opposite groove fixtures 122 defining at least one groove and a fixing bracket for supporting and fixing the two groove fixtures 122. The two groove fixtures 122 are spaced from each other. The shape of the two groove fixtures 122 is not limited and can be set according to the shape of the bent flexible substrate 104. Specifically, the shape of the cross section of the groove fixtures 122 is similar to the shape of the cross section of the bent flexible substrate 104. In one embodiment, the cross section of the bent flexible substrate 104 is helical in shape, and the groove fixture 122 defines a helical groove that accommodates the end of the helical shaped flexible substrate 104. Specifically, two ends of the flexible substrate 104 along an axis of the flexible substrate 104 are movably disposed in the helical grooves of the groove fixtures 122. Accordingly, the two ends of the flexible substrate 104 are fixed in the two groove fixtures 122, and the middle portion of the flexible substrate 104 is suspended.

In step (b), the flexible substrate 104 is gradually pulled out from the groove fixtures 122 along the helical grooves of the groove fixtures 122 by the unbending tool. Accordingly, the flexible substrate 104 is unbent. Accordingly, the carbon nanotube array 102 grown on the flexible substrate 104 is also unbent.

In step (c), during the unbending of the flexible substrate 104, the carbon nanotube film 100 is gradually drawn out from the unbent carbon nanotube array 102 using the drawing tool. Namely, the flexible substrate 104 is gradually unbent, along with the carbon nanotube array 102 grown on the unbent flexible substrate 104 as it is gradually depleted. In addition, when drawing out the carbon nanotube film 100, the drawing direction of the carbon nanotube film 100 is substantially the same as the unbending direction of the flexible substrate 104.

Furthermore, when the carbon nanotubes are gradually pulled out from the flexible substrate 104, the flexible substrate 104 without the carbon nanotube array 102 can be rolled up again.

The area of the bent flexible substrate 104 may be large. When the bent flexible substrate 104 is unbent into a flat shape, the flat flexible substrate 104 will take up a large space. The steps S2, S3, and S4 being simultaneously executed can save space while drawing out the carbon nanotube film 100, and only a portion of the flexible substrate 104 can be unbent during the entire drawing process.

Furthermore, the carbon nanotube film 100 can be adhered on a surface of a supporting substrate. The supporting substrate can be a flexible laminar substrate 110. The process of adhering the carbon nanotube film 100 to the laminar substrate 110 can be simultaneously executed with the process of drawing the carbon nanotube film 100.

The process of adhering the carbon nanotube film 100 includes the following steps:

B1, providing a flexible laminar substrate 110 having a first surface 112 and a second surface 114;

B2, adhering one initiating end of the carbon nanotube film 100 on the first surface 112 of the laminar substrate 110;

B3, moving the laminar substrate 110 to drive the carbon nanotube film 100 in motion, thereby continuously drawing out the carbon nanotube film 100 from the carbon nanotube array 102, and continuously adhering the carbon nanotube film 100 on the laminar substrate 110.

The laminar substrate 110 can be polyethylene terephthalate plastic. The laminar substrate 110 can be wound on a first reel 106 for conserving the occupied space of the laminar substrate 110.

Furthermore, a laser can irradiate the carbon nanotube film 100 before adhering the carbon nanotube film 100 on the laminar substrate 110. The carbon nanotube film 100 absorbs parts of the laser, and the laser burns up parts of the carbon nanotubes in the carbon nanotube film 100. Thus, a thickness of the carbon nanotube film 100 irradiated by the laser is decreased, thereby increasing transparency of the carbon nanotube film 100.

Furthermore, an adhesive layer can be uniformly coated on the first surface 112 of the laminar substrate 110 before adhering the carbon nanotube film 100 to the laminar substrate 110. The adhesive layer can be made of viscous, ultraviolet curing glue. In addition, after adhering the carbon nanotube film 100 on the first surface 112, the carbon nanotube film 100 and the laminar substrate 110 are hot-pressed or irradiated by ultraviolet to solidify the adhesive layer.

In the above hot-processing process, two rollers 116 are provided. The two rollers 116 are opposite, wherein one roller 116 is in contact with the carbon nanotube film 100, and another roller 116 is in contact with the second surface 114 of the laminar substrate 110. The two rollers 116 simultaneously and continuously roll and apply pressure on the laminar substrate 110 coated with the carbon nanotube film 100 during rotation. In addition, while applying pressure on the laminar substrate 110, the laminar substrate 110 coated with the carbon nanotube film 100 is heated to solidify the adhesive layer. Thus, the carbon nanotube film 100 can be smoothly adhered on the laminar substrate 110.

Furthermore, a second reel 108 is provided. The laminar substrate 110 coated with the carbon nanotube film 100 is gradually wound on the second reel 108. The second surface 114 of the laminar substrate 110 can be further coated by silicon, paraffin, or Teflon, by which a cohesive force between the carbon nanotube film 100 and the first surface 112 is greater than a cohesive force between the carbon nanotube film 100 and the second surface 114. Thus, the laminar substrate 110 coated with the carbon nanotube film 100 can be unbent from the second reel 108 according to practical application.

Figure 4:
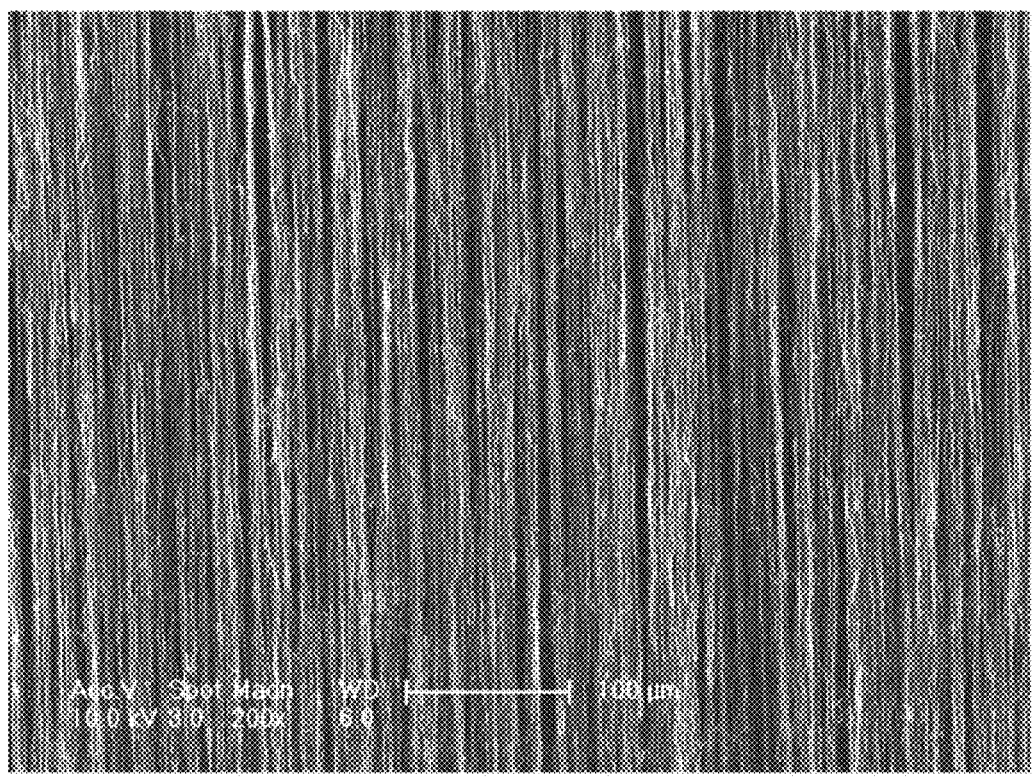
FIG. 4 is a Scanning Electron Microscope (SEM) image of the carbon nanotube film.

Referring to FIG. 4, the carbon nanotube film 100 includes a plurality of carbon nanotubes and has a free-standing structure.

A large number of the carbon nanotubes in the carbon nanotube film 100 can be oriented along a preferred orientation, meaning that a large number of the carbon nanotubes in the carbon nanotube film 100 are arranged substantially along the same direction and parallel to the surface of the carbon nanotube film 100. An end of one carbon nanotube is joined to another end of an adjacent carbon nanotube arranged substantially along the same direction by van der Waals attractive force. A small number of the carbon nanotubes are randomly arranged in the carbon nanotube film 100, and have a small if not negligible effect on the larger number of the carbon nanotubes in the carbon nanotube film 100 arranged substantially along the same direction.

The term "free-standing structure" means that the carbon nanotube film 100 can sustain the weight of itself when it is hoisted by a portion thereof without any significant damage to its structural integrity. So, if the carbon nanotube film 100 is placed between two separate supports, a portion of the carbon nanotube film 100 not in contact with the two supports, would be suspended between the two supports and maintain film structural integrity. The free-standing structure is different from powder which would collapse if the powder is not in contact with the two supports. The free-standing structure of the carbon nanotube film 100 is realized by the successive carbon nanotubes joined end to end by van der Waals attractive force.

It can be appreciated that some variation can occur in the orientation of the carbon nanotubes in the carbon nanotube film 100 as can be seen in FIG. 4. Microscopically, the carbon nanotubes oriented substantially along the same direction may not be perfectly aligned in a straight line, and some curve portions may exist. It can be understood that contact between some carbon nanotubes located substantially side by side and oriented along the same direction cannot be totally excluded.

More specifically, the carbon nanotube film 100 includes a plurality of successively oriented carbon nanotube segments 143 joined end-to-end by van der Waals attractive force therebetween. Each carbon nanotube segment 143 includes a plurality of carbon nanotubes 145 substantially parallel to each other, and joined by van der Waals attractive force therebetween. The carbon nanotube segments 143 can vary in width, thickness, uniformity, and shape.

The thickness of the carbon nanotube film 100 is in a range from about 0.5 nm to about 100 μm. The length of the carbon nanotube film 100 is related to the area of the carbon nanotube array 102. The specific surface area of the carbon nanotube film 100 is larger than 100 square meters per gram. The carbon nanotube film 100 has a good transmission of light. A transmittance of the visible light can achieve 80% before laser irradiation, and can achieve 93% after laser irradiation.

The larger number of the carbon nanotubes in the carbon nanotube film 100 are arranged substantially along a length direction of the carbon nanotube film 100. Thus, the carbon nanotube film 100 along the length direction has good electrical conductivity and thermal conductivity.

Compared with the conventional rigid substrate, the flexible substrate 104 can be bent into a certain shape to accommodate the space of the reaction furnace. Accordingly, the carbon nanotube array 102 having a large area can be grown on the bent flexible substrate 104, and the carbon nanotube film 100 having a large area can be drawn out from the carbon nanotube array 102. In addition, the flexible substrate 104 can be unbent into a flat shape. Correspondingly, the carbon nanotube array 102 grown on the flexible substrate 104 can also be flattened into a flat shape. Thus, the carbon nanotube film 100 can be easily drawn out from the flat carbon nanotube array.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making a carbon nanotube film comprising:
   providing a bent flexible substrate having a curved surface;
   fabricating a carbon nanotube array on the curved surface;
   at least partially unbending the bent flexible substrate, thereby at least partially unbending the carbon nanotube array;
   contacting the unbent carbon nanotube array with a drawing tool, thereby selecting a carbon nanotube segment from the carbon nanotube array; and
   drawing the selected carbon nanotube segment with the drawing tool, thereby forming the carbon nanotube film.

2. The method as claimed in claim 1, wherein when drawing the selected carbon nanotube segment, other carbon nanotube segments are also drawn out end-to-end due to van der Waals attractive force between ends of adjacent carbon nanotube segments.

3. The method as claimed in claim 1, wherein the flexible substrate is entirely unbent into a flat shape.

4. The method as claimed in claim 1, wherein the flexible substrate is partially unbent into a flat shape.

5. The method as claimed in claim 4, wherein when drawing the selected carbon nanotube segment, the bent flexible substrate is continuously unbent into the flat shape, thereby continuously providing a flat shaped carbon nanotube array as the carbon nanotube film is continuously drawn out from the carbon nanotube array.

6. The method as claimed in claim 5, wherein a drawing direction of the carbon nanotube film is substantially the same as an unbending direction of the flexible substrate.

7. The method as claimed in claim 5, wherein two ends of the flexible substrate along an axis of the bent flexible substrate are movably disposed into two groove fixtures, before partially unbending the bent flexible substrate.

8. The method as claimed in claim 7, wherein an unbending tool is further provided to clamp and draw a free end of the bent flexible substrate, thereby drawing out and unbending the flexible substrate from the groove fixtures.

9. The method as claimed in claim 5, wherein after the carbon nanotubes have been drawn away from the flexible substrate, the flexible substrate is rolled up.

10. The method as claimed in claim 1, wherein the flexible substrate is bent to form a curved surface.

11. The method as claimed in claim 10, wherein the curved surface is a tubular shaped surface, or a helical shaped surface.

12. The method as claimed in claim 1, wherein when forming the carbon nanotube film, the carbon nanotube film is connected to the drawing tool at one end and connected to the carbon nanotube array at an opposite end, and a drawing angle greater than or equal to 0 degrees and smaller than 90 degrees is defined between the carbon nanotube film and the flexible substrate at the connecting position of the carbon nanotube film with the carbon nanotube array.

13. The method as claimed in claim 1, further comprising:
providing a flexible laminar substrate having a first surface and a second surface;
adhering one end of the carbon nanotube film connecting with the drawing tool on the first surface of the laminar substrate; and
moving the flexible laminar substrate to drive the carbon nanotube film in motion, thereby continuously drawing out the carbon nanotube film from the carbon nanotube array and continuously adhering the carbon nanotube film on the flexible laminar substrate.

14. The method as claimed in claim 13, further comprising uniformly coating an adhesive layer on the first surface of the flexible laminar substrate before adhering the carbon nanotube film on the flexible laminar substrate.

15. The method as claimed in claim 14, wherein the adhesive layer is made of an ultraviolet curing glue, and the method further comprises irradiating the carbon nanotube film with ultraviolet after the carbon nanotube film is adhered on the flexible laminar substrate.

16. The method as claimed in claim 13, further comprising irradiating the carbon nanotube film by laser before adhering one end of the carbon nanotube film on the first surface of the laminar substrate.

17. The method as claimed in claim 13, wherein the flexible laminar substrate is rolled up after adhering the carbon nanotube film on the flexible laminar substrate.

18. The method as claimed in claim 1, wherein the flexible substrate is a metal slice, and a thickness of the flexible substrate is smaller than or equal to about 3 mm.

19. The method as claimed in claim 1, wherein the flexible substrate is a quartz slice, a silicon slice, or a ceramic slice, and a thickness of the flexible substrate is smaller than or equal to about 0.3 mm.

* * * * *